(12) United States Patent
Hipsh et al.

(10) Patent No.: US 10,084,877 B2
(45) Date of Patent: Sep. 25, 2018

(54) HYBRID CLOUD STORAGE EXTENSION USING MACHINE LEARNING GRAPH BASED CACHE

(71) Applicant: VMware, Inc., Palo Alto, CA (US)

(72) Inventors: Lior Hipsh, Hod Hasharon (IL); Yoel Calderon, Hod Hasharon (IL)

(73) Assignee: VMware, Inc., Palo Alto, CA (US)

( * ) Notice: Subject to any disclaimer, the term of this patent is extended or adjusted under 35 U.S.C. 154(b) by 314 days.

(21) Appl. No.: 14/920,010

(22) Filed: Oct. 22, 2015

(65) Prior Publication Data
US 2017/0118273 A1   Apr. 27, 2017

(51) Int. Cl.
*H04L 29/08* (2006.01)

(52) U.S. Cl.
CPC .......... *H04L 67/2847* (2013.01); *H04L 67/10* (2013.01)

(58) Field of Classification Search
CPC .................................................. H04L 67/2847
USPC ......................................................... 709/219
See application file for complete search history.

(56) References Cited

U.S. PATENT DOCUMENTS 8,943,154 B1*  1/2015  Bodell ............... H04L 41/0604
                                                709/206
2015/0379121 A1* 12/2015  Akolkar ........... G06F 17/30707
                                                707/723

OTHER PUBLICATIONS

Ishii et al., "Access Map Pattern Matching for High Performance Data Cache Prefetching", http://www.jilp.org/vol13/v13paper3.pdf, Journal of Instruction-Level Parallelism 13 (2011) pp. 1-24.

(Continued)

*Primary Examiner* — David Lazaro
*Assistant Examiner* — Zia Khurshid

(57) ABSTRACT

Prefetching techniques for a hybrid cloud system are described. The techniques include maintaining a graph in a graph database, the graph including nodes associated with data items to be accessed and links between the nodes, each link including an associated link weight. Conceptually, the link weights are indicative of how likely it is for a data item to which the link points to be accessed after the data item associated with the node from which the link extends is accessed. The link weights are updated as items are accessed and the graph is traversed. The graph structure and associated techniques help to reduce latency in a hybrid cloud system by providing for prefetch of items anticipated to be used at a later time.

20 Claims, 10 Drawing Sheets

(56) References Cited

OTHER PUBLICATIONS

Shawn Brenneman, "Prefetching resources", Google Developers, Oct. 2015, https://developers.google.com/speed/articles/prefetching p. 1-3.

Hazem Anwar Gomaa, "University of Calgary, Markov Chain Analysis of Web Cache Systems under TTL-based Consistency", http://theses.ucalgary.ca/bitstream/11 023/596/2/ucalgary_2013_gomaa_hazem.pdf, Apr. 2013, consists of 205 pages.

"CouchBaseServer", http://www.couchbase.com/nosql-databases/about-couchbase-server#AlwaysAvailable. Consists of 10 pages, Oct. 22, 2015.

"Replication Introduction—MongoDB Manual 3.0", http://docs.mongodb.org/manual/core /replication-introduction/, consists of 3 pages. Oct. 22, 2015.

"AWS Amazon Simple Storage Services (S3)—Online Cloud Storage for Data & Files", http://aws.amazon.com/s3/, consists of 5 pages, Oct. 22, 2015.

"Wikipedia—Cache Algorithm", http://en.wikipedia.org/wiki/Cache_algorithms, consists of 6 pages, Oct. 22, 2015.

\* cited by examiner

HYBRID CLOUD STORAGE EXTENSION USING MACHINE LEARNING GRAPH BASED CACHE

BACKGROUND

Cloud architectures are used in cloud computing and cloud storage systems for offering infrastructure-as-a-service (IaaS) cloud services. Examples of cloud architectures include the VMware vCloud Director® cloud architecture software, Amazon EC2™ web service, and OpenStack™ open source cloud computing service. IaaS cloud service is a type of cloud service that provides access to physical and/or virtual resources in a cloud environment. These services provide a tenant application programming interface (API) that supports operations for manipulating IaaS constructs such as virtual machines (VMs) and logical networks. The use of such public cloud services is typically kept separate from the use of existing computing resources in data centers managed by an enterprise. With an increasing trend in migrating data centers to cloud platforms, there is an increasing demand for a hybrid model of executing workflows seamlessly across public cloud services and data center computing resources.

Hybrid cloud architectures include some computing components in an "on-premise location" and some computing components in an "off-premise" location, where the on-premise and off-premise computing components cooperate to execute workflows. Hybrid cloud architectures may be used to extend the capabilities of applications executing on an on-premise computer system. However, there are some downsides associated with the non-local nature of components of the hybrid cloud architecture. For example, while local storage is associated with a relatively low amount of latency, latency across the network that connects non-local components of the hybrid cloud architecture is relatively high.

SUMMARY

Embodiments of the present disclosure provide a method for prefetching data in a hybrid cloud system having an on-premise computing system and an off-premise computing system. The method includes receiving, at the on-premise computing system, a request to access a first data item. The method also includes identifying, within a graph structure, a sequence of accesses made prior to requesting the access to the first data item. The method further includes identifying, within the graph structure, a node that is a threshold number of hops forward from the requested item. The method also includes calculating a weighting score for the identified node, based on a set of links that terminate on the identified node. The method further includes determining that the weighting score is above a weighting score threshold. The method also includes responsive to determining that the weighting score is above the weighting threshold, prefetching, from the off-premise computing system, a second data item associated with the identified node.

Further embodiments include a non-transitory computer-readable storage medium storing instructions that cause a computer to carry out the above method and a system for performing the above method.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
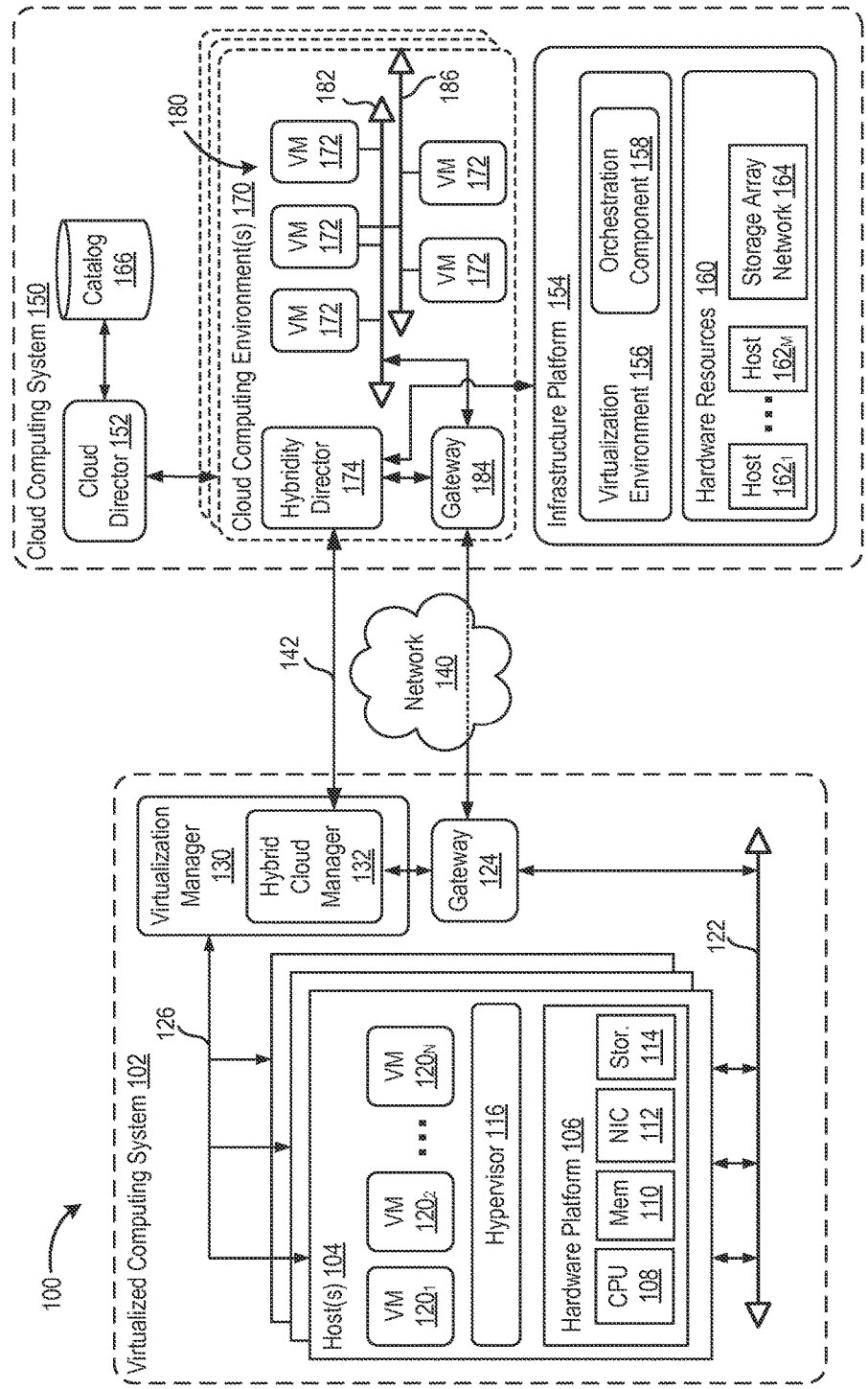
FIG. 1 is a block diagram that illustrates a computer system in which one or more embodiments may be utilized.

FIG. 1 is a block diagram of a hybrid cloud computing system 100 in which one or more embodiments of the present disclosure may be utilized. Hybrid cloud computing system 100 includes a virtualized computing system 102 and a cloud computing system 150, and is configured to provide a common platform for managing and executing virtual workloads seamlessly between virtualized computing system 102 and cloud computing system 150. In one embodiment, virtualized computing system 102 may be a data center controlled and administrated by a particular enterprise or business organization, while cloud computing system 150 is operated by a cloud computing service provider and exposed as a service available to account holders, such as the particular enterprise in addition to other enterprises. As such, virtualized computing system 102 may sometimes be referred to as an on-premise data center(s), and cloud computing system 150 may be referred to as a "public" cloud service. In some embodiments, virtualized computing system 102 itself may be configured as a private cloud service provided by the enterprise.

As used herein, an internal cloud or "private" cloud is a cloud in which a tenant and a cloud service provider are part of the same organization, while an external or "public" cloud is a cloud that is provided by an organization that is separate from a tenant that accesses the external cloud. For example, the tenant may be part of an enterprise, and the external cloud may be part of a cloud service provider that is separate from the enterprise of the tenant and that provides cloud services to different enterprises and/or individuals. In embodiments disclosed herein, a hybrid cloud is a cloud architecture in which a tenant is provided with seamless access to both private cloud resources and public cloud resources.

Virtualized computing system 102 includes one or more host computer systems 104. Hosts 104 may be constructed on a server grade hardware platform 106, such as an x86 architecture platform, a desktop, and a laptop. As shown, hardware platform 106 of each host 104 may include conventional components of a computing device, such as one or more processors (CPUs) 108, system memory 110, a network interface 112, storage 114, and other I/O devices such as, for example, a mouse and keyboard (not shown). Processor 108 is configured to execute instructions, for example, executable instructions that perform one or more operations described herein and may be stored in memory 110 and in local storage. Memory 110 is a device allowing information, such as executable instructions, cryptographic keys, virtual disks, configurations, and other data, to be stored and retrieved. Memory 110 may include, for example, one or more random access memory (RAM) modules. Network interface 112 enables host 104 to communicate with another device via a communication medium, such as a network 122 within virtualized computing system 102. Network interface 112 may be one or more network adapters, also referred to as a Network Interface Card (NIC). Storage 114 represents local storage devices (e.g., one or more hard disks, flash memory modules, solid state disks, and optical disks) and/or a storage interface that enables host 104 to communicate with one or more network data storage systems. Examples of a storage interface are a host bus adapter (HBA) that couples host 104 to one or more storage arrays, such as a storage area network (SAN) or a network-attached storage (NAS), as well as other network data storage systems.

Each host 104 is configured to provide a virtualization layer that abstracts processor, memory, storage, and networking resources of hardware platform 106 into multiple virtual machines $120_1$ to $120_N$ (collectively referred to as VMs 120) that run concurrently on the same hosts. VMs 120 run on top of a software interface layer, referred to herein as a hypervisor 116, that enables sharing of the hardware resources of host 104 by VMs 120. One example of hypervisor 116 that may be used in an embodiment described herein is a VMware ESXi™ hypervisor provided as part of the VMware vSphere® solution made commercially available from VMware, Inc. Hypervisor 116 may run on top of the operating system of host 104 or directly on hardware components of host 104.

Virtualized computing system 102 includes a virtualization management module (depicted in FIG. 1 as virtualization manager 130) that may communicate to the plurality of hosts 104 via a network, sometimes referred to as a management network 126. In one embodiment, virtualization manager 130 is a computer program that resides and executes in a central server, which may reside in virtualized computing system 102, or alternatively, running as a VM in one of hosts 104. One example of a virtualization management module is the VMware vCenter Server™ product made available from VMware, Inc. Virtualization manager 130 is configured to carry out administrative tasks for computing system 102, including managing hosts 104, managing VMs 120 running within each host 104, provisioning VMs, migrating VMs from one host to another host, and load balancing between hosts 104.

In one embodiment, virtualization manager 130 includes a hybrid cloud management module (depicted as hybrid cloud manager 132) configured to manage and integrate virtual computing resources provided by cloud computing system 150 with virtual computing resources of computing system 102 to form a unified "hybrid" computing platform. Hybrid cloud manager 132 is configured to deploy VMs in cloud computing system 150, transfer VMs from virtualized computing system 102 to cloud computing system 150, and perform other "cross-cloud" administrative task, as described in greater detail later. In one implementation, hybrid cloud manager 132 is a module or plug-in complement to virtualization manager 130, although other implementations may be used, such as a separate computer program executing in a central server or running in a VM in one of hosts 104.

In one embodiment, hybrid cloud manager 132 is configured to control network traffic into network 122 via a gateway component (depicted as a gateway 124). Gateway 124 (e.g., executing as a virtual appliance) is configured to provide VMs 120 and other components in virtualized computing system 102 with connectivity to an external network 140 (e.g., Internet). Gateway 124 may manage external public IP addresses for VMs 120 and route traffic incoming to and outgoing from virtualized computing system 102 and provide networking services, such as firewalls, network address translation (NAT), dynamic host configuration protocol (DHCP), load balancing, and virtual private network (VPN) connectivity over a network 140.

In one or more embodiments, cloud computing system 150 is configured to dynamically provide an enterprise (or users of an enterprise) with one or more virtual data centers 180 in which a user may provision VMs 120, deploy multi-tier applications on VMs 120, and/or execute workloads. Cloud computing system 150 includes an infrastructure platform 154 upon which a cloud computing environment 170 may be executed. In the particular embodiment of FIG. 1, infrastructure platform 154 includes hardware resources 160 having computing resources (e.g., hosts $162_1$ to $162_N$), storage resources (e.g., one or more storage array systems, such as SAN 164), and networking resources, which are configured in a manner to provide a virtualization environment 156 that supports the execution of a plurality of virtual machines 172 across hosts 162. It is recognized that hardware resources 160 of cloud computing system 150 may in fact be distributed across multiple data centers in different locations.

Each cloud computing environment 170 is associated with a particular tenant of cloud computing system 150, such as the enterprise providing virtualized computing system 102. In one embodiment, cloud computing environment 170 may be configured as a dedicated cloud service for a single tenant comprised of dedicated hardware resources 160 (i.e., physically isolated from hardware resources used by other users of cloud computing system 150). In other embodiments, cloud computing environment 170 may be configured as part of a multi-tenant cloud service with logically isolated virtual computing resources on a shared physical infrastructure. As shown in FIG. 1, cloud computing system 150 may support multiple cloud computing environments 170, available to multiple enterprises in single-tenant and multi-tenant configurations.

In one embodiment, virtualization environment 156 includes an orchestration component 158 (e.g., implemented as a process running in a VM) that provides infrastructure resources to cloud computing environment 170 responsive to provisioning requests. For example, if an enterprise required a specified number of virtual machines to deploy a web applications or to modify (e.g., scale) a currently running web application to support peak demands, orchestration component 158 can initiate and manage the instantiation of virtual machines (e.g., VMs 172) on hosts 162 to support such requests. In one embodiment, orchestration component 158 instantiates virtual machines according to a requested template that defines one or more virtual machines having specified virtual computing resources (e.g., compute, networking, storage resources). Further, orchestration component 158 monitors the infrastructure resource consumption levels and requirements of cloud computing environment 170 and provides additional infrastructure resources to cloud computing environment 170 as needed or desired. In one example, similar to virtualized computing system 102, virtualization environment 156 may be implemented by running on hosts 162 VMware ESX®-based hypervisor technologies provided by VMware, Inc. of Palo Alto, Calif. (although it should be recognized that any other virtualization technologies, including Xen® and Microsoft Hyper-V® virtualization technologies may be utilized consistent with the teachings herein).

In one embodiment, cloud computing system 150 may include a cloud director 152 (e.g., run in one or more virtual machines) that manages allocation of virtual computing resources to an enterprise for deploying applications. Cloud director 152 may be accessible to users via a REST (Representational State Transfer) API (Application Programming Interface) or any other client-server communication protocol. Cloud director 152 may authenticate connection attempts from the enterprise using credentials issued by the cloud computing provider. Cloud director 152 maintains and publishes a catalog 166 of available virtual machine templates and packaged virtual machine applications that represent virtual machines that may be provisioned in cloud computing environment 170. A virtual machine template is a virtual machine image that is loaded with a pre-installed guest operating system, applications, and data, and is typically used to repeatedly create a VM having the pre-defined configuration. A packaged virtual machine application is a logical container of pre-configured virtual machines having software components and parameters that define operational details of the packaged application. An example of a packaged VM application is vApp™ technology made available by VMware, Inc., of Palo Alto, Calif., although other technologies may be utilized. Cloud director 152 receives provisioning requests submitted (e.g., via REST API calls) and may propagates such requests to orchestration component 158 to instantiate the requested virtual machines (e.g., VMs 172).

In the embodiment of FIG. 1, cloud computing environment 170 supports the creation of a virtual data center 180 having a plurality of virtual machines 172 instantiated to, for example, host deployed multi-tier applications. A virtual data center 180 is a logical construct that provides compute, network, and storage resources to an organization. Virtual data centers 180 provide an environment where VM 172 can be created, stored, and operated, enabling complete abstraction between the consumption of infrastructure service and underlying resources. VMs 172 may be configured similarly to VMs 120, as abstractions of processor, memory, storage, and networking resources of hardware resources 160.

Virtual data center 180 includes one or more virtual networks 182 used to communicate between VMs 172 and managed by at least one networking gateway component (e.g., gateway 184), as well as one or more isolated internal networks 186 not connected to gateway 184. Gateway 184 (e.g., executing as a virtual appliance) is configured to provide VMs 172 and other components in cloud computing environment 170 with connectivity to external network 140 (e.g., Internet). Gateway 184 manages external public IP addresses for virtual data center 180 and one or more private internal networks interconnecting VMs 172. Gateway 184 is configured to route traffic incoming to and outgoing from virtual data center 180 and provide networking services, such as firewalls, network address translation (NAT), dynamic host configuration protocol (DHCP), and load balancing. Gateway 184 may be configured to provide virtual private network (VPN) connectivity over a network 140 with another VPN endpoint, such as a gateway 124 within virtualized computing system 102. In other embodiments, gateway 184 may be configured to connect to communicate with virtualized computing system 102 using a high-throughput, dedicated link (depicted as a direct connect 142) between virtualized computing system 102 and cloud computing system 150. In one or more embodiments, gateways 124 and 184 are configured to provide a "stretched" layer-2 (L2) network that spans virtualized computing system 102 and virtual data center 180, as shown in FIG. 1.

While FIG. 1 depicts a single connection between on-premise gateway 124 and cloud-side gateway 184 for illustration purposes, it should be recognized that multiple connections between multiple on-premise gateways 124 and cloud-side gateways 184 may be used. Furthermore, while FIG. 1 depicts a single instance of a gateway 184, it is recognized that gateway 184 may represent multiple gateway components within cloud computing system 150. In some embodiments, a separate gateway 184 may be deployed for each virtual data center, or alternatively, for each tenant. In some embodiments, a gateway instance may be deployed that manages traffic with a specific tenant, while a separate gateway instance manages public-facing traffic to the Internet. In yet other embodiments, one or more gateway instances that are shared among all the tenants of cloud computing system 150 may be used to manage all public-facing traffic incoming and outgoing from cloud computing system 150.

In one embodiment, each virtual data center 180 includes a "hybridity" director module (depicted as hybridity director 174) configured to communicate with the corresponding hybrid cloud manager 132 in virtualized computing system 102 to enable a common virtualized computing platform between virtualized computing system 102 and cloud computing system 150. Hybridity director 174 (e.g., executing as a virtual appliance) may communicate with hybrid cloud manager 132 using Internet-based traffic via a VPN tunnel established between gateways 124 and 184, or alternatively, using direct connect 142. In one embodiment, hybridity director 174 may control gateway 184 to control network traffic into virtual data center 180. In some embodiments, hybridity director 174 may control VMs 172 and hosts 162 of cloud computing system 150 via infrastructure platform 154.

Hybrid cloud computing system 100 may be used to execute an application, such as a database, "across" the hardware of the hybrid cloud computing system 100. In one example, a database executing within a host 104 of virtualized computing system 102 may also at least partially execute in cloud computing system 150 or may be provided with services by one or more hosts 162 in cloud computing system 150. One service provided may be extending the storage capabilities of the one or more hosts 104 executing the database. One issue with extending storage capabilities in such a manner is that due to the connection over network 140, latency in accessing data stored in cloud computing system 150 may be very high—substantially higher than if the data were stored locally. Prefetching techniques, such as those described herein, may help to improve data access latency in such systems by fetching data before the data is to be accessed by the database (or other software) based on access prediction techniques.

Figure 2:
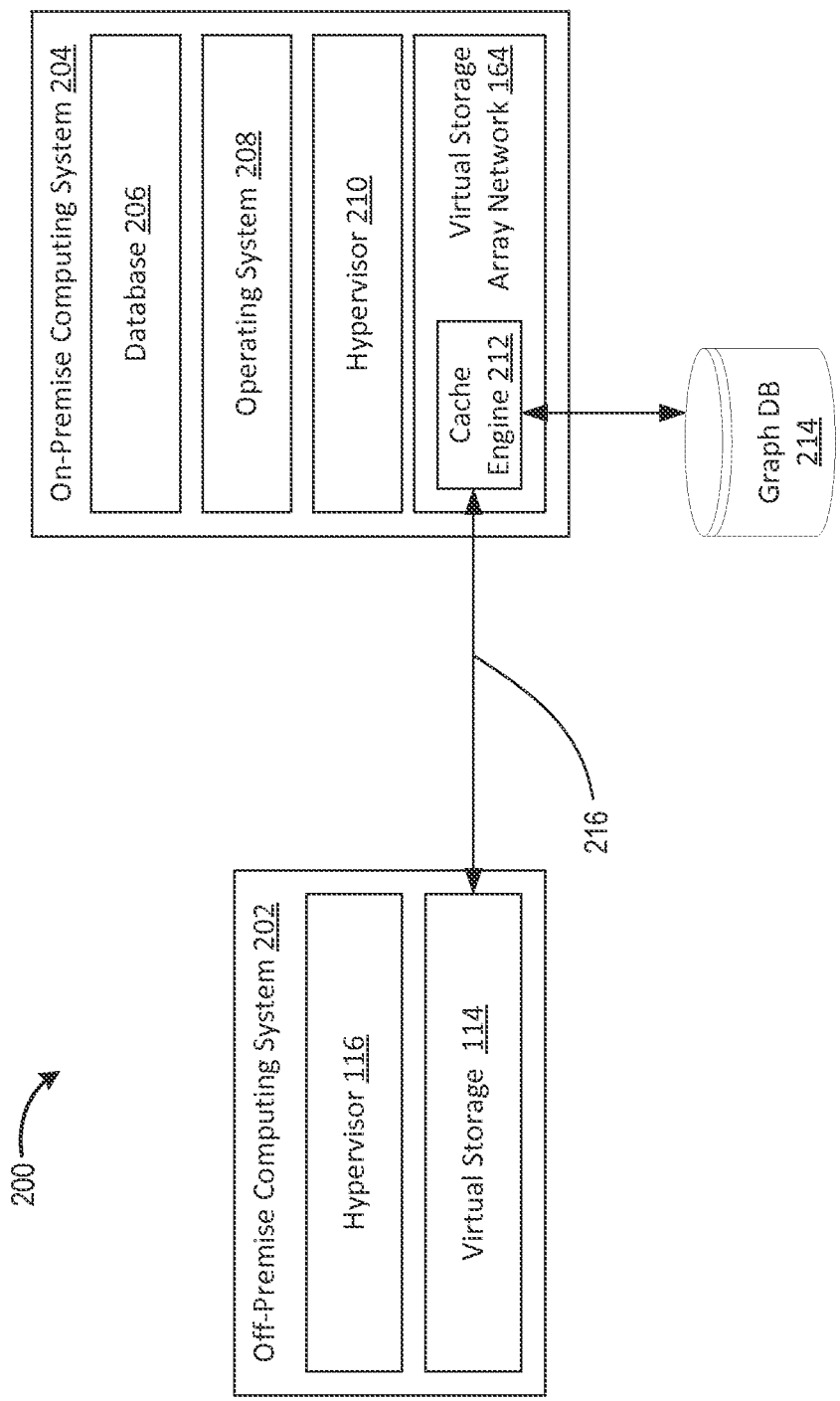
FIG. 2 is a block diagram of a prefetch system for prefetching stored data, according to an example.

FIG. 2 is a block diagram of a prefetch system 200 for prefetching stored data, according to an example. As shown, the prefetch system 200 includes an off-premise computing system 202 connected to an on-premise computing system 204. On-premise computing system 204 may be a host 104 or VM 120 of virtualized computing system 102 and off-premise computing system 202 may be a host 162 or VM 172 of cloud computing system 150. Note that either or both of off-premise computing system 202 and on-premise computing system 204 may include one or more of the VMs or one or more of the host computing systems illustrated in FIG. 1.

Off-premise computing system 202 stores data (such as database records) in virtual storage 114. Similarly, on-premise computing system 204 stores data (such as database records) in virtual storage array network 164. Off-premise computing system 202 includes a hypervisor 116 that manages virtual storage 114. On-premise computing system 204 includes a database 206, managed by operating system 208, which, in some embodiments, is executed in a virtual machine by hypervisor 210, and in other embodiments, may be executed by an operating system outside of a virtual machine, in a container, or in a different context.

Database 206 may store large amounts of data for access by other computer software or other computing systems. Among other functions, off-premise computing system 202 acts as a store (e.g., primary or secondary store) for the data for database 206. Thus, data for database 206 is stored at least partially in virtual storage array network 164, with some data for the database being stored at least partially in virtual storage 114 of off-premise computing system 202. Connection 216 made between off-premise computing system 202 and on-premise computing system 204 may be a connection made over a computer network such as a wide area network ("WAN"), a global computing network such as the Internet, or other type of computing network. Typically, latency over such computing networks is in the realm of 10 to 100 milliseconds. For many workloads associated with databases, this level of latency may result in poor performance.

To accommodate for the latency over connection 216, cache engine 212 implements access pattern-based prefetch techniques. Specifically, cache engine 212 maintains, within graph database 214, a graph structure associated with the pattern of accesses of data associated with database 206. When database 206 accesses a particular data item (also referred to herein simply as an "item"), cache engine 212 records that access in graph database 214. The recorded information includes which particular item of data is accessed, as well as which item of data was accessed immediately prior. In this manner, cache engine 212 builds up, within graph DB 214, a graph that records the order of accesses made by database 206.

The term "data items" (or "items") refer to specific subdivisions of data used by database 206. In some embodiments, "items" may refer to storage blocks, which are units of storage data that have a fixed size. Storage blocks may be disk blocks, for example, which are generally the smallest unit of data to be read or written by a physical hard drive. Storage blocks may alternatively be other "chunks" of data that include information for database 206. In other embodiments, database items are database objects. Database objects are logical data constructs that store information about the logical structure of the database. Typically, the logical structure and function of databases is described with database objects.

When database 206 accesses a particular item, cache engine 212 checks graph DB 214 to determine if items should be prefetched. After determining whether and which items to prefetch, cache engine 212 sends a request to off-premise computing system 202 to obtain such items and, after receiving the items, stores them in virtual storage array network 164. This is the act of prefetching—requesting a particular item from off-premise computing system 202 in "anticipation" of that item being requested at a later time, and storing the item in storage that is local to the database, so that the item is available locally, rather than in a remote storage (the off-premise computing system) when that item is prefetched at a later time. The act of prefetching these items means that items are more likely to be found within virtual storage array network 164 when accessed by database 206. Specific techniques for maintaining graph DB 214 and for using graph DB 214 to perform prefetching are described below.

Note that although a database is described as the entity that utilizes cache engine 212 to prefetch data, any other software or hardware entity may alternatively use the cache engine 212 to prefetch data. Note also that FIG. 2 illustrates an embodiment of cache engine 212 in which the data items are block items. If logical database objects are used instead, cache engine 212 may sit in database 206, as database 206 has knowledge of the logical organization of the database structure it maintains. Such a cache engine may be embodied as a plugin for database 206, and will act to monitor database operations 206 and request prefetches based on the operations. Utilizing object-based prefetching, as opposed to block-based prefetching may provide performance advantages due to a better correspondence with how database 206 is used as compared with block-based prefetching. To facilitate object-based prefetch, on-premise computing system 204 may maintain a table mapping object ID to storage block ID, which may be maintained per application (i.e., database 206) and is not shared between multiple computing systems.

Figure 3:
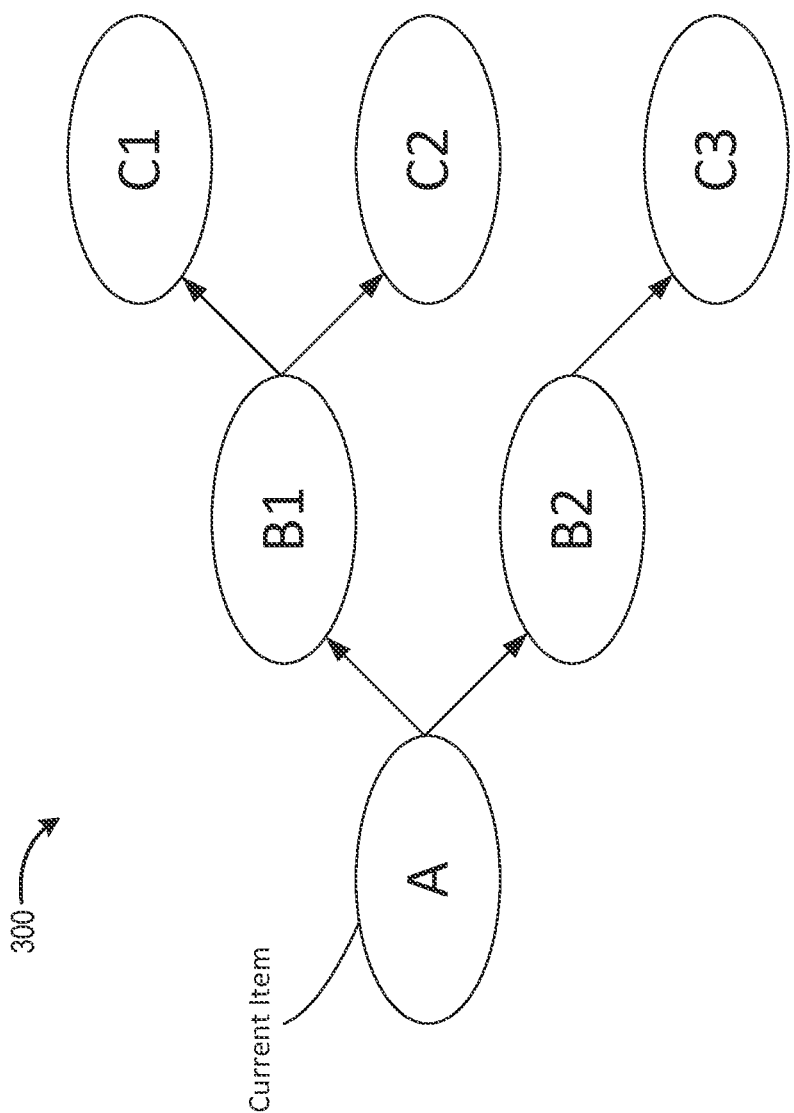
FIG. 3 is a graph that illustrates aspects of techniques for utilizing the graph database illustrated in FIG. 2 to prefetch data items, according to an example.

FIG. 3 is a graph 300 that illustrates aspects of techniques for utilizing graph DB 214 to prefetch data items, according to an example. Graph 300 represents at least a portion of the data stored in graph DB 214. As shown, graph 300 includes nodes (shown as ovals) and links (shown as arrows). Graph 300 illustrates a "current item" which is the item associated with the database 206 that is accessed most recently. It is access of this "current item" that triggers cache engine 212 to examine graph DB 214 to determine which items to prefetch. The other nodes of graph 300 are all nodes that are "forward in time" from the node associated with the current item ("A"). This means that graph 300 indicates that in the past, both B1 and B2 were accessed immediately after A, both C1 and C2 were accessed immediately after B1, and C3 was accessed immediately after C3.

Cache engine 212 utilizes the nodes and links in graph 300 to determine which items to prefetch. In one example, cache engine 212 is set to retrieve items that are two "hops" in the future from a currently accessed item, where the term "hop" refers to the order of access of items (e.g., an item accessed immediately after another item is one "hop" after that item). In this example, when database 206 accesses item A, cache engine 212 examines graph 300 stored within graph DB 214 and determines that B1 and B2 were previously accessed immediately after A and that C1, C2, and C3 were previously accessed immediately after either B1 or B2. Because cache engine 212 prefetches items two "hops" from a currently accessed item, cache engine 212 may request from off-premise computing system 202 (FIG. 2) any or all of items B1, B2, C1, C2, and C3.

Cache engine 212 may implement a number of additional features, such as link weights, indirect links, and other features, to enhance the prefetch mechanics. Broadly speaking, link weights is a technique whereby cache engine 212 assigns and maintains link weights for links in order to help select items for prefetch. Indirect links are links from one node to a node that was not accessed immediately after the first node, but instead was accessed more than one "hop" after the first node. Indirect links can be used to refine decisions regarding whether a particular node should be prefetched. Cache engine 212 may also use weight aging to adjust links that may have been valid in the past but are no longer valid due to changing access patterns. These techniques, and others, are now described.

Figure 4A:
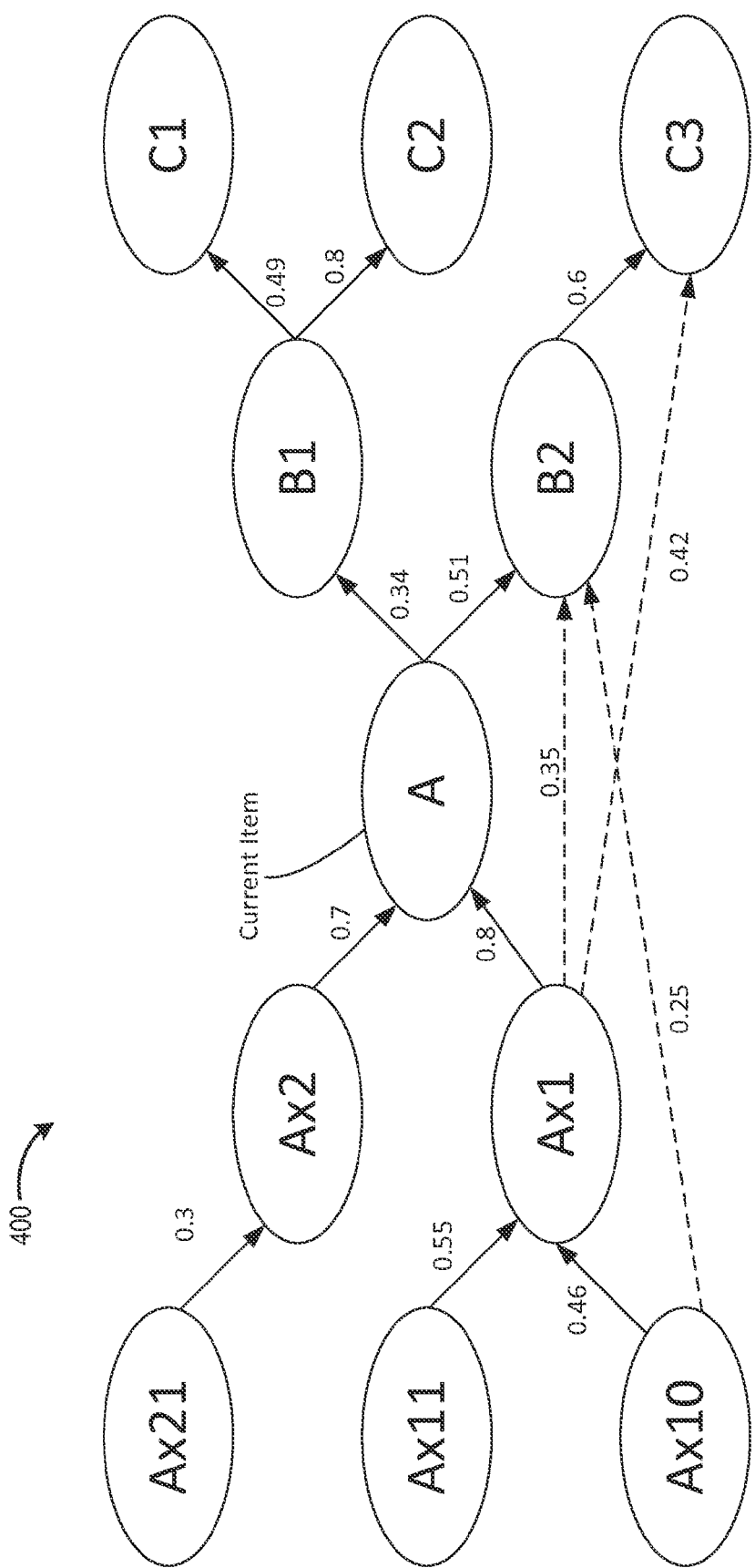
FIG. 4A is a graph that illustrates aspects of indirect links and link weights, according to an example.

FIG. 4A is a graph 400 that illustrates aspects of indirect links and link weights, according to an example. As shown, the graph 400 includes a node representing a currently accessed item (A), nodes representing items subsequent to the current item (B1, B2, C1, C2, and C3), and nodes representing items prior to the current item (Ax21, Ax11, Ax10, Ax2, and Ax1). The graph 400 also includes direct links, which indicate that in the past, an item associated with a node at the head of the direct link was accessed immediately after an item associated with a node at the tail of the direct link, similar to graph 300 shown in FIG. 3. The graph 400 further includes indirect links (dotted lines), which indicate that in the past, an item associated with a node at the head of the indirect link was accessed after, but not immediately after an item associated with a node at the tail of the indirect link. Graph 400 also shows example link weights. Cache engine 212 uses link weights to determine whether to prefetch an item associated with a particular node.

Some example techniques for updating graph DB 214 when accessing data items are provided. Also provided are example techniques for prefetching data items based on graph DB 214. As database 206 requests access to data items, cache engine 212 records the order in which those data items are accessed. Each data item that is accessed is recorded in graph DB 214. If no node corresponding to that data item exists in graph DB 214, cache engine 212 creates a new node associated with that data item and a new link that extends from the node associated with the data item accessed immediately prior to the newly created node to the newly created node. Cache engine 212 assigns a starting weight to the newly created link. The starting weight can be set to any desired value. In some embodiments, the starting weight for each newly created link is identical. Cache engine 212 may also create indirect links upon creating a new node in graph DB 214. Indirect links are created between nodes associated with data items accessed within X number of data items prior to the access of the current node, and the current node.

If a node corresponding to the newly accessed data item does exist in graph DB 214 when access to a data item is requested, then cache engine 212 determines whether a direct link and indirect links connecting previously-accessed nodes with the current access exist (where "current access" refers to the data item that is most recently accessed data item as well as the data items accessed immediately prior to the most recently accessed data item and data items accessed prior to that data item, up to a threshold number of hops prior). If any such links do not exist, then cache engine 212 creates those links. For example, if a link from the node associated with the data item accessed immediately prior to the currently accessed data item to the node associated with the currently accessed data item does not exist, then cache engine 212 creates such a link. Similarly, if one or more indirect links that link nodes for older data item accesses to the currently accessed node do not exist, then cache engine 212 creates those links as well, giving them initial weight values. Note that indirect links are only created for data items accessed up to a predefined indirect link max distance, where the term "predefined indirect link max distance" refers to a particular number of hops prior to the currently accessed data item. In one example, the indirect link max distance is three and indirect links are only created for data items accessed up to three hops prior to the currently accessed data item.

If a direct link from the immediately prior node to the current node does exist, then cache engine 212 increases the weight for that link by a fixed amount. The fixed amount may be a fixed percentage of the weight or a fixed value. Similarly, if an indirect link from an older node to the current node exists, then cache engine 212 increases the weight for that link. The increase for indirect links is done more slowly than for direct links. In some embodiments, the increase for indirect links is done 5 times slower than for direct links while in other embodiments, the increase is done 10 times lower than for direct links. Other differences in the rate at which weight is increased are possible as well. The reason that indirect links may be increased more slowly than direct links is that the effect of an indirect link on prefetch calculation is smaller than that for direct links. This is because direct links are likely to appear in sequences more often than indirect links, which justifies the use of a normalization factor in the prefetch calculation.

To prefetch, cache engine 212 examines graph DB 214 based on the data item that is currently being accessed. If cache engine 212 does not find a node associated with that data item, then no prefetching is performed. If cache engine 212 finds a node associated with that data item, then cache engine 212 identifies all nodes that are up to a maximum number of hops from that node in the future. For example, cache engine 212 identifies nodes that lie at the end of a link extending from the node associated with the current data item (a first "hop"), identifies nodes that lie at the end of those nodes (a second "hop"), and so on up to a maximum number of hops. For each identified node, a weighting score is calculated, where the weighting score is used to determine whether to prefetch the data item associated with the node for which the weighting score is calculated.

Figure 4B:
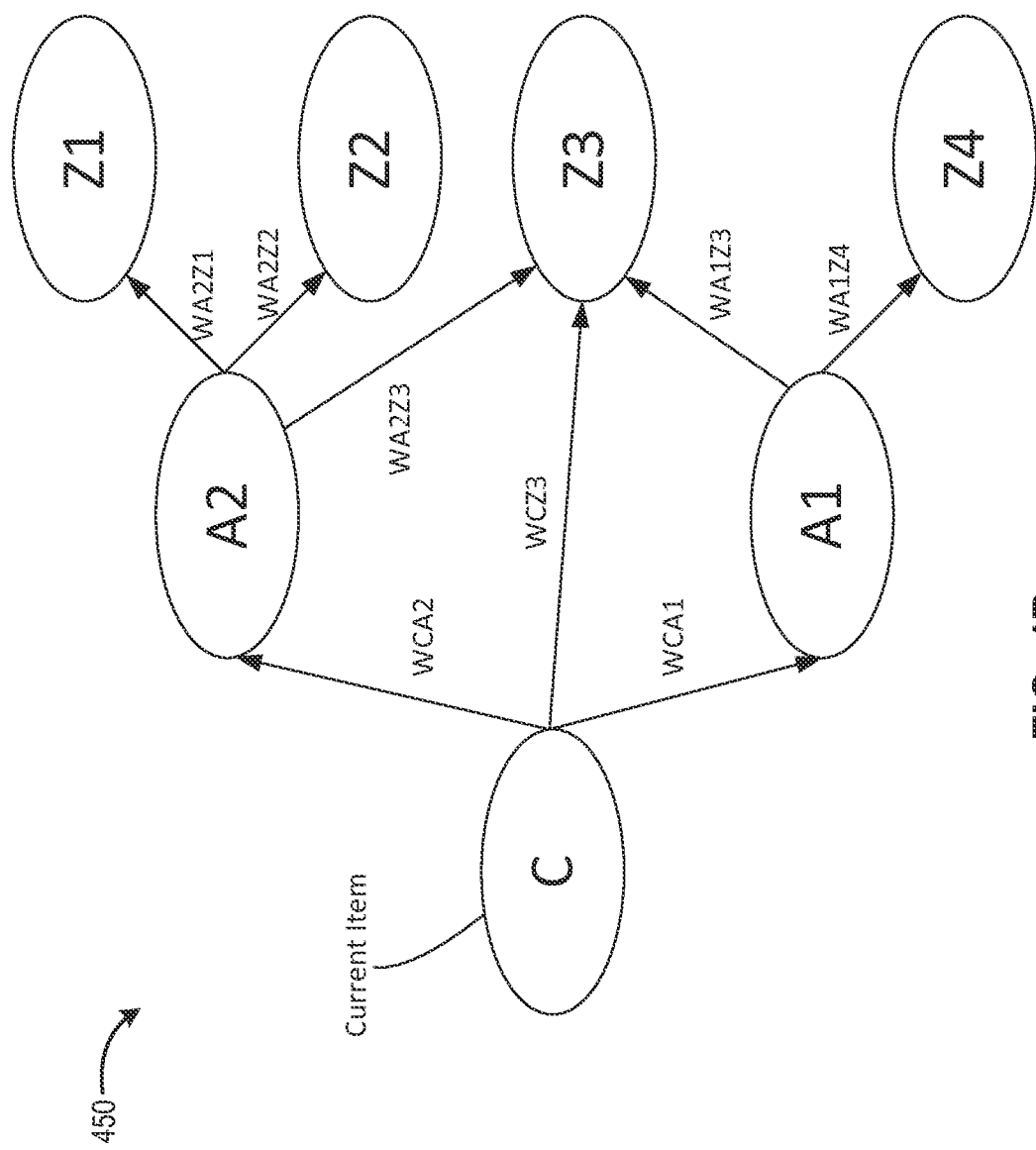
FIG. 4B is a graph for illustrating a technique for calculating a scale factor, according to an example.

FIG. 4B is a graph for illustrating a technique for calculating a weighting score, according to an example. Graph 450 is similar to other graphs illustrated in, for example, FIG. 4A. Nodes (e.g., C, A2, A1, Z1, and the like), are connected via links, which each has a link weight. The link weights are indicated as "WXY" where "X" is the origin node and "Y" is the terminal node for the link.

As described above, weighting scores are calculated for each node that is up to a maximum number of hops from the current data item. For any particular node for which a weighting score is calculated, the weighting score is calculated as the sum of weighting scores for each path that is up to the maximum number of hops in length and that leads from the current node to the node for which the weighting score is calculated. The weighting score for any particular path is calculated as follows:

$$\text{Weighting score}_{PATH} = (\text{Scale Factor}_{LINK1})*(\text{Link Weight}_{LINK1})*(\text{Scale Factor}_{LINK2})*(\text{Link Weight}_{LINK2})* \ldots *(\text{Scale Factor}_{LINK\_N})*(\text{Link Weight}_{LINK\_N}) \quad \text{(Equation 1)}$$

In other words, the weight score for a path is calculated as the product of all link weights in the path and all scale factors for those link weights.

Scale Factor$_{LINKX}$ is a predetermined scaling factor for links of the type for which the scaling factor is applied. Links are typed based on the distance from the current item. Thus, scaling factors differ based on the number of hops between nodes. In some embodiments, scale factors decrease as the number of hops from the current item increases.

As stated above, a weighting score is calculated for each path that is up to the maximum number of hops in length and that lies between the current item and the node for which a weighting score is being calculated. The weighting scores for each such path are then added together to arrive at the weighting score for the node for which the weighting score is calculated.

In the example illustrated in FIG. 4B, a weighting score for node Z3 is calculated as follows:

$$W_{Z3} = WCZ3 * F1 + WCA2 * F1 * WA2Z3 * F2 + WCA1 * F1 * WA1Z4 * F2$$

This calculation is made because there are three paths from C to Z3. The first path, using the indirect link, is just the weight for that link—WCZ3—multiplied by the scaling factor for a "1-distance link"—F1. The second path is from C to A2 to Z3, and the corresponding weighting score is thus a product of the scaled first link weight WCA2 and the scaled second link weight WA2Z3. The third path is from C to A1 to Z3, and the corresponding weighting score is thus a product of the scaled first link weight WCA1 and the scaled second link weight WA1Z3. Note that "distance," as described herein, simply refers to the number of links (and does not necessarily correspond to the concept of "hops" which is related to the order of accesses).

The calculated weighting score is used to determine whether to prefetch the identified node. Specifically, if the weighting score for a particular node is above a weighting threshold, then the node is prefetched and if the weighting score is not above the weighting threshold, then the node is not prefetched. The weighting threshold can be varied based on available resources such as network bandwidth or the like. The weighting scores can also be used to sort nodes. If a limited number of nodes can be prefetched, those with high scores can be prefetched, while those with lower scores are not prefetched.

Figure 5:
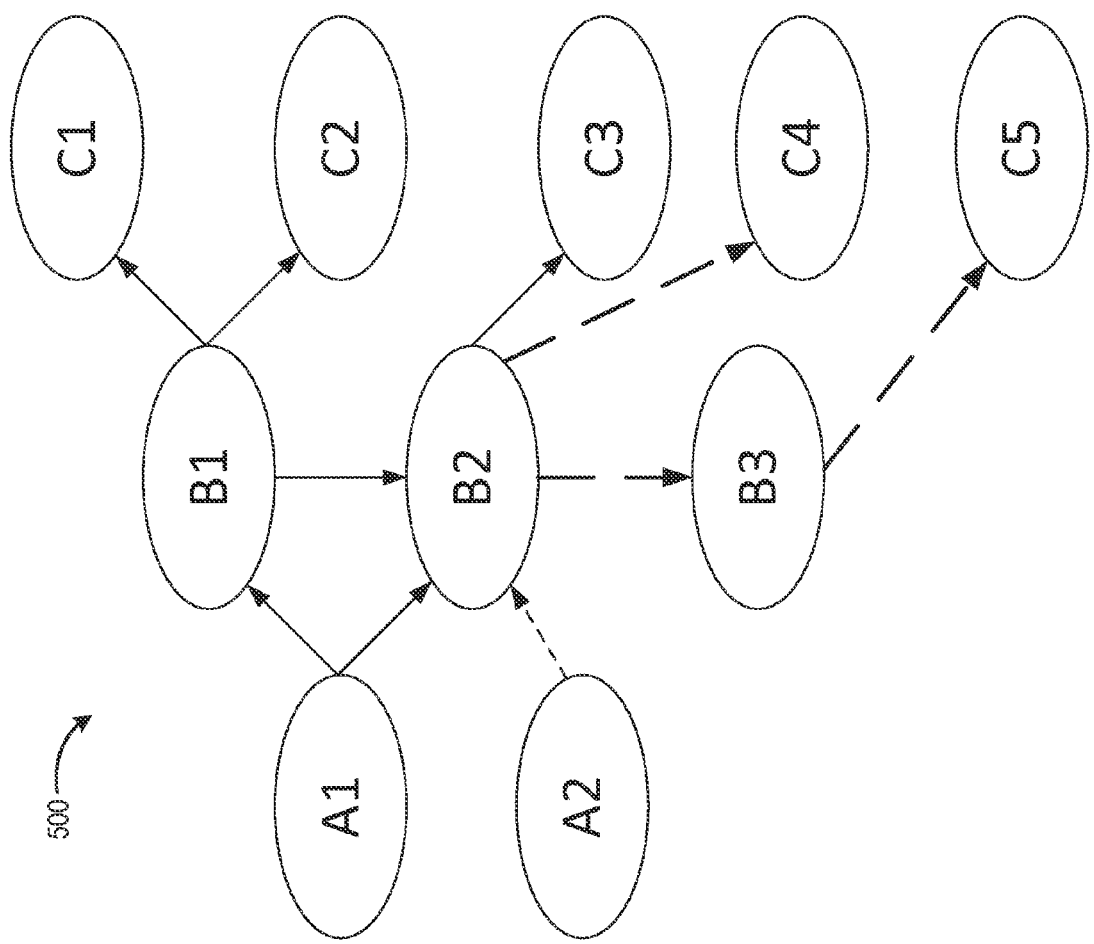
FIG. 5 is a graph that illustrates techniques for aging weights of a graph for prefetching data, according to an example.

FIG. 5 is a graph 500 that illustrates techniques for aging weights of a graph for prefetching data, according to an example. As shown, graph 500 includes several nodes (A1, A2, B1, B2, B3, C1, C2, C3, C4, C5) connected by links. No "currently accessed node" is illustrated in graph 500 because graph 500 is associated with a time when cache engine 212 is examining graph DB 214 for the purpose of aging at least some of the links stored in graph DB 214.

Graph 500 includes several types of links. One type of links represents links that have been traversed "recently" (i.e., have been traversed within an immediately preceding period of a threshold duration, such as the past 24 hours or the like). Such links are shown with solid lines in FIG. 5 (e.g., the link between A1 and B1 or B2). Another type of link represents links that have not been traversed "recently" (i.e., have not been traversed within an immediately preceding period of the threshold duration) but that extend a threshold distance from links that have been traversed recently. For example, the link from B2 to B3 has not been traversed recently but extends only one link from B2, which has been traversed to recently (both from A1 and from B2). The link from B2 to B3 may be thought of as a "cold link" that is close to a "warm" area. It may be desirable to clean such "cold links" that are close to "warm areas" in order to maintain the area of the graph that is near to areas of the graph that is likely to be accessed soon. The links from B2 to B3 and from B2 to C3 and C4 are of a similar type. The threshold distance may be a number of links such as three links or some other number of links. These types of links are represented with heavy dotted lines. Another type of link represents links that have not been traversed recently and also do not extend a threshold distance from links that have been traversed recently. The link from A2 to B2 in graph 500 is this type of link.

For link aging, in some embodiments, cache engine 212 ages the first and second types of links (links that have been accessed recently and those that extend a threshold distance from links that have been accessed recently), but not links of the third type (links that neither have been accessed recently nor that extend a threshold distance from links that have been accessed recently). To age link weights, cache engine 212 identifies all links that have either been traversed recently or that extend a threshold distance from links that have been traversed recently and reduces the weight value for each of those links. Reduction can be done in various ways, such as by an absolute value (i.e., subtracting a fixed value from the weight) or by a percentage (i.e., subtracting a percentage of the weight). In other embodiments, cache engine 212 ages all links in graph DB 214.

Link aging helps to keep graph DB 214 "current" or "up-to-date." In other words, links that are old are less likely to be prefetched as compared with newer links because old links might reflect data access patterns that are no longer valid. Some efficiency is gained by aging only links that are accessed recently as well as links that extend a threshold distance from the links that are accessed recently. Even though links not accessed recently are links that "should" be aged according to the rationale that unused links should affect prefetch decisions less, it is also true that links not accessed recently are less likely to be accessed again in the near future. Thus, during prefetch calculation, these links will not harm the quality of score calculation for prefetch. Thus, aging only links of the first and second types described above represents a tradeoff between the processing power needed to age every single link in graph DB 214 and the accuracy gained by doing so. By aging a "cushion" of links that extend a threshold distance from links that have been accessed recently, some links that have not been accessed may be aged, thus providing the benefit that links within the "neighborhood" of currently used links will be less likely to be prefetched.

An alternative embodiment is to age all links within graph DB 214. This may be done if computing resources are available or if additional aging accuracy is desired.

Figure 6:
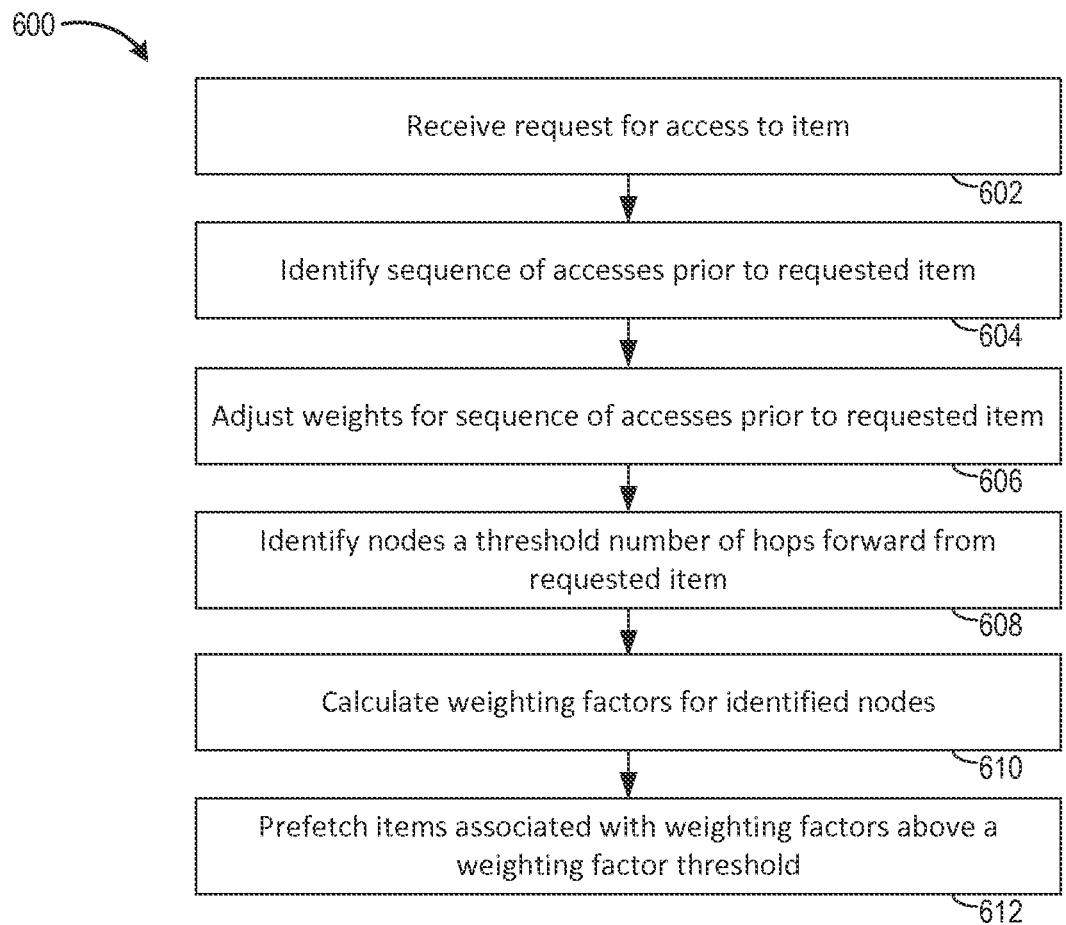
FIG. 6 is a flow diagram of a method for prefetching data, according to an example.

FIG. 6 is a flow diagram of a method 600 for prefetching data and updating a graph database, according to an example. Although described with reference to the system of FIGS. 1 and 2, those of skill in the art will recognize that any system that performs method 600, in various technically feasible orders, falls within the scope of the present invention.

As shown, method 600 begins at step 602, where virtual storage array network 164 receives a request to access an item. At step 604, cache engine 212 identifies a sequence of accesses prior to the requested item. The sequence includes the order of requests for items prior to the currently accessed item. At step 606, cache engine 212 adjusts weights for the identified sequence. Cache engine 212 adjusts weights by adding a fixed value for each direct link to the node associated with the currently accessed item and by adding a fixed value multiplied by a scaling factor for indirect links to the node associated with the currently accessed item. The scaling factor is based on the number of hops from the current node the indirect link points to and decreases with distance from the current node. In some embodiments, weights do not increase past a maximum weight value.

At step 608, cache engine 212 identifies nodes that are a threshold number of hops forward from the requested item. Specifically, each node at the end of a direct link from the current node is identified, each node at the end of a direct link from those nodes is identified, and so on, up to a threshold distance from the current node. Note that in step 608, cache engine 212 may also identify, as candidates for prefetch, nodes that are linked to by indirect links of the sequence of accesses identified in step 604.

At step 610, cache engine 212 calculates weighting scores for each of the nodes identified in step 608. A weighting score for a node may be dependent on link weights for links (direct and indirect) that terminate at the node. The weighting score may be equal to a sum of weighting scores for each path that terminates at the node, where the weighting score for a particular path is calculated as the product of each link weight and each link scaling factor in that path. In some embodiments, weighting score are calculated as described above with respect to FIG. 4B. At step 612, cache engine 212 prefetches each item for which the calculated weighting score is above a weighting threshold. Note that items are of course only prefetched if they are not stored in virtual storage array network 164 when requested.

Note that virtual storage array network 164 has a limited amount of space. Items may be removed from virtual storage array network 164 based on a least-frequently-used technique, where least frequency used items are removed from virtual storage array network 164. Removed items may be written back to virtual storage 114 in off-premise computing system 202 if the items contain dirty data (i.e., data that is different than data stored in virtual storage 114). Note also that the graph DB 214 may store indications of whether data for any particular node is stored in virtual storage array network 164 and thus needs to be prefetched.

Although FIG. 2 illustrates one possible architecture for which the techniques disclosed herein may be used, other architectures are possible. Several example architectures are now described with respect to FIGS. 7-9.

Figure 7:
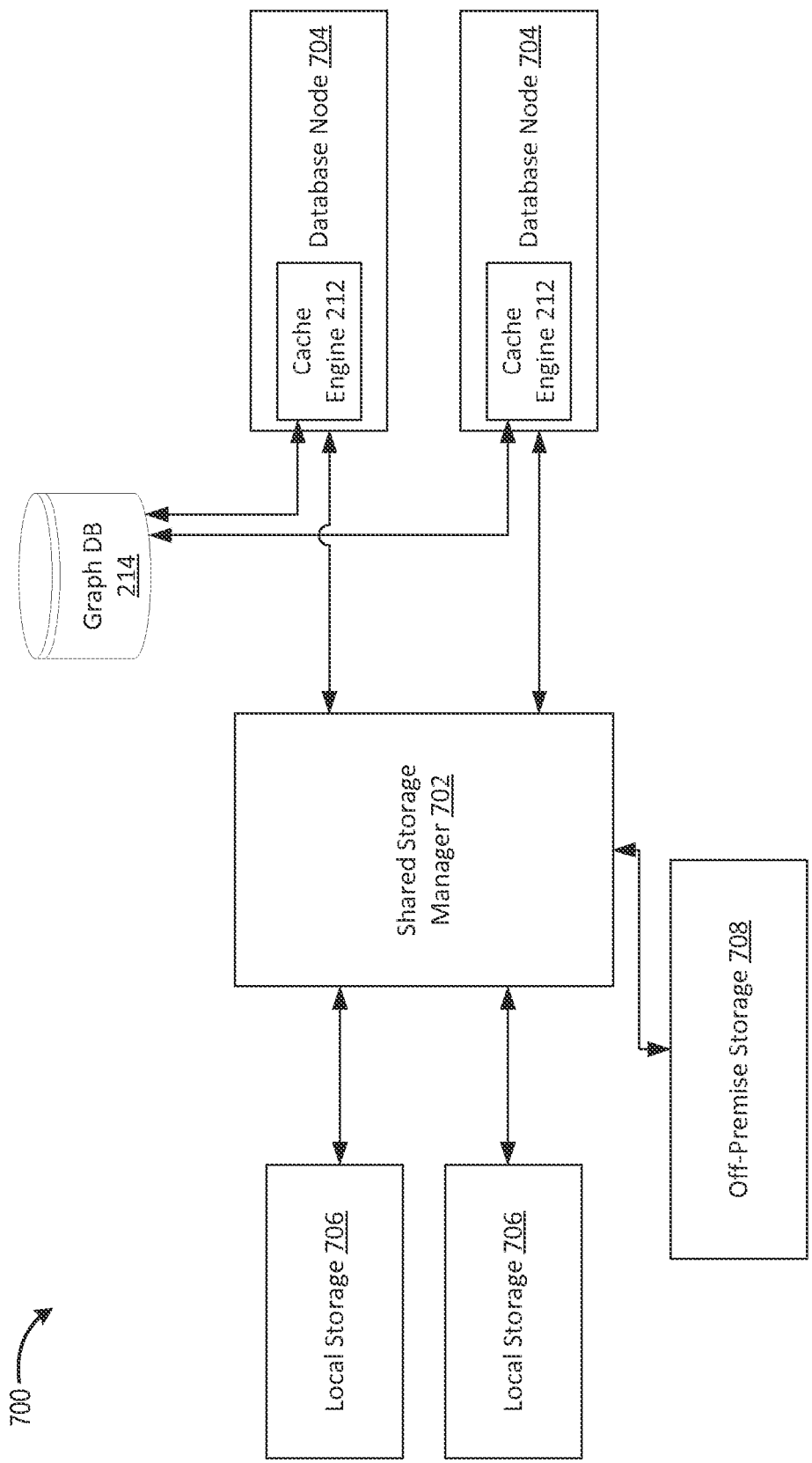
FIG. 7 is a block diagram of a shared storage system implementing prefetch, according to an example.

FIG. 7 is a block diagram of a shared storage system 700 implementing prefetch, according to an example. As shown, shared storage system 700 includes database nodes 704, coupled to a graph database 214 and to shared storage manager 702, which is coupled to local storage 706 and off-premise storage 708.

Database nodes 704 represent database software executing in different physical computer systems within on-premise computing system 204. The physical computer systems hosting database nodes 704 are part of an active-active cluster, meaning that each such computer system performs independent work and that work performed in any particular computer system can be "failed over" to another computer system in the active-active cluster in the event that the computer system fails.

In this active-active cluster, shared storage manager 702 implements shared storage, with some data stored in local storage 706 and some data also stored in off-premise storage 708. Cache engines 212 utilizes graph DB 214 to tell shared storage manager 702 what to prefetch, into local storage 706, from off-premise storage 708. Note that the graph DB 214 is a single, integrated graph DB 214 for both database nodes 704.

Database nodes 704 may access shared storage via SAN ("storage area network") or iSCSi ("Internet Small Computer System Interface"). Also, although only two database nodes 704 and two local storage elements 706 are shown, additional database nodes 704 and local storage elements 706 could be included in shared storage system 700.

Figure 8:
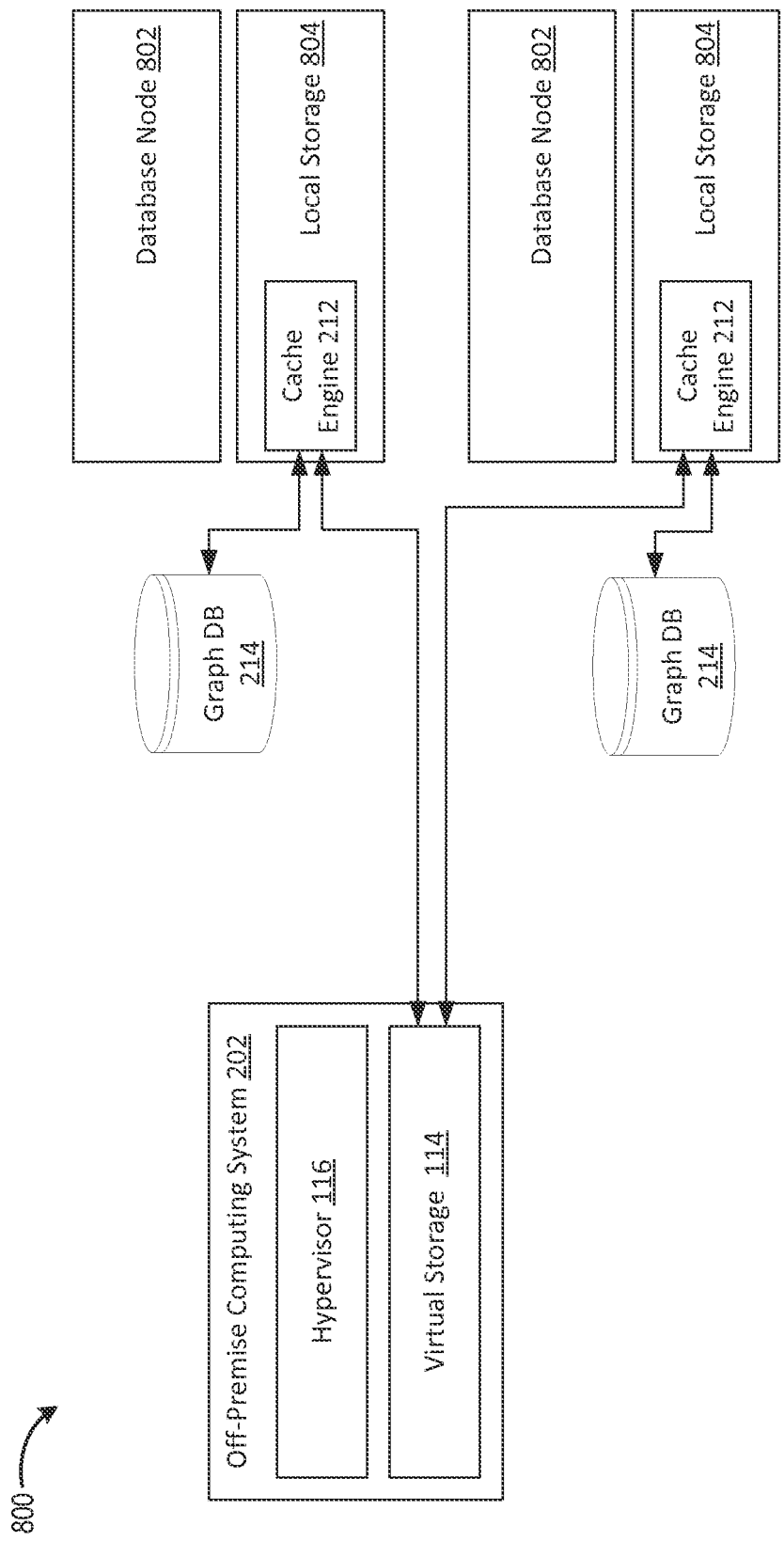
FIG. 8 is a block diagram of a sharded database system implementing prefetch, according to an example.

FIG. 8 is a block diagram of a sharded database system 800 implementing prefetch, according to an example. As shown, sharded database system 800 includes database nodes 802, each coupled to a respective local storage 804. Local storages 804 include cache engines 212 that interface with respective graph DBs 214 and virtual storage 114 at off-premise computing system 202.

In the system 800 of FIG. 8, each database node 804 maintains an independent database from other database nodes 804. Thus, each database node 802 utilizes its own local storage 804 and its own graph DB 214. Essentially, each database node 802 operates independently.

Figure 9:
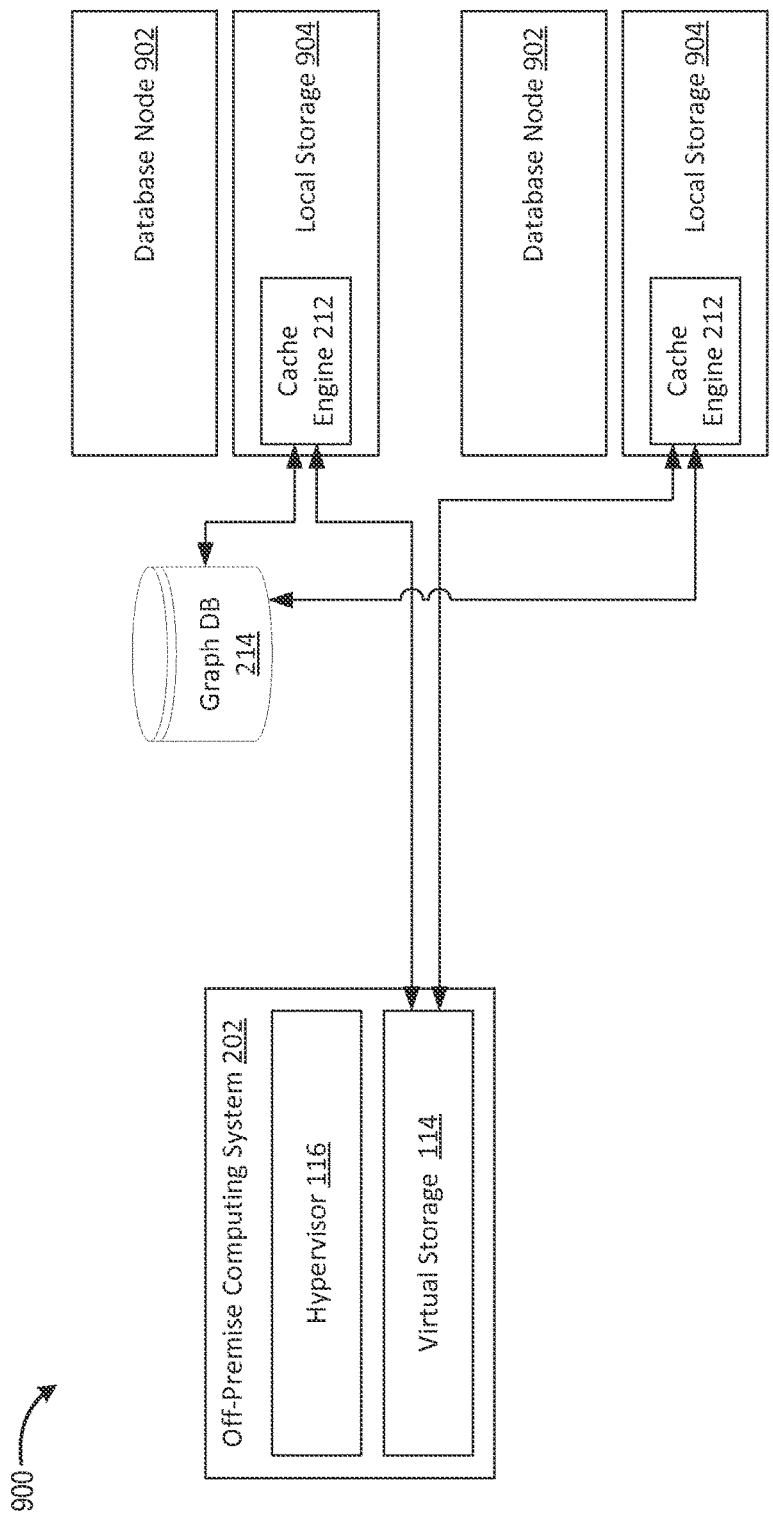
FIG. 9 is a block diagram of a cooperative sharded system, according to an example.

FIG. 9 is a block diagram of a cooperative sharded system 900, according to an example. In the system 900, database nodes 902 and local storage 904 are similar to the corresponding elements of FIG. 8 (database nodes 802 and local storage 804) but the databases are not completely independent. For example, database objects may be distributed between database nodes 902, resulting in a predictable pattern of reads across disparate database nodes 902. Thus, cache engines 212 maintain and access a shared graph DB 214.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. As used herein, the term "container" refers generically to both virtual machines and OS-less containers.

Although one or more embodiments have been described herein in some detail for clarity of understanding, it should be recognized that certain changes and modifications may be made without departing from the spirit of the disclosure. The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, yielding, identifying, determining, or comparing. Any operations described herein that form part of one or more embodiments of the disclosure may be useful machine operations. In addition, one or more embodiments of the disclosure also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present disclosure may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present disclosure have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Many variations, modifications, additions, and improvements are possible. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method for prefetching data in a hybrid cloud system having an on-premise computing system and an off-premise computing system, comprising:
   receiving, at the on-premise computing system, a request to access a first data item;
   identifying, within a graph structure, a sequence of accesses made prior to requesting the access to the first data item;
   identifying, within the graph structure, a node that is a threshold number of hops forward from the requested item;
   calculating a weighting score for the identified node, based on a set of links that terminate on the identified node;
   determining that the weighting score is above a weighting score threshold; and
   responsive to determining that the weighting score is above the weighting score threshold, prefetching, from the off-premise computing system, a second data item associated with the identified node.

2. The method of claim 1, wherein each link of the set of links includes an associated link weight.

3. The method of claim 2, further comprising:
   modifying the link weights of the links of the set of links based on the request to access the first data item.

4. The method of claim 3, wherein modifying the link weights comprises:
   adding a fixed value for each direct link in the set of links.

5. The method of claim 4, further comprising:
   determining that after the fixed value is added to a link weight for a direct link in the set of links, the link weight for the direct link is greater than a maximum link weight value, and
   setting the link weight for the direct link to the maximum link weight value.

6. The method of claim 3, wherein:
   the set of links includes an indirect link; and
   modifying the link weights comprises adding a fixed value multiplied by a scaling factor for the indirect link.

7. The method of claim 6, wherein the scaling factor is based on the number of hops from an origin node of the indirect links to the node, which is pointed to by the indirect link.

8. The method of claim 2, wherein calculating the weighting score comprises:
   scaling a first link weight included in a first link of the set of links to produce a scaled link weight; and
   adding the scaled link weight to a second link weight included in a second link of the set of links to produce the weighting score.

9. The method of claim 1, wherein prefetching comprises requesting the second data item from the off-premise computing system and storing the second data item in storage local to the on-premise computing system.

10. A system for prefetching data in a hybrid cloud system having an on-premise computing system and an off-premise computing system, comprising:
    the on-premise computing system, including a memory and a processor configured to execute a cache engine, the cache engine configured to:
    receive a request to access a first data item, identify, within a graph structure, a sequence of accesses made prior to requesting the access to the first data item, identify, within the graph structure, a node that is a threshold number of hops forward from the requested item, calculate a weighting score for the identified node, based on a set of links that terminate on the identified node, determine that the weighting score is above a weighting score threshold, and responsive to determining that the weighting score is above the weighting score threshold, prefetch, from the off-premise computing system, a second data item associated with the identified node.

11. The system of claim 10, wherein each link of the set of links includes an associated link weight.

12. The system of claim 11, wherein the cache engine is further configured to:

modify the link weights of the links of the set of links based on the request to access the first data item.

13. The system of claim 12, wherein the cache engine is configured to modify the link weights by:

adding a fixed value for each direct link in the set of links.

14. The system of claim 13, wherein the cache engine is further configured to:

determine that after the fixed value is added to a link weight for a direct link in the set of links, the link weight for the direct link is greater than a maximum link weight value, and set the link weight for the direct link to the maximum link weight value.

15. The system of claim 12, wherein:

the set of links includes an indirect link; and the cache engine is configured to modify the link weights by adding a fixed value multiplied by a scaling factor for the indirect link.

16. The system of claim 15, wherein the scaling factor is based on the number of hops from an origin node of the indirect links to the node, which is pointed to by the indirect link.

17. The system of claim 11, wherein the cache engine is configured to calculate the weighting score by:

scaling a first link weight included in a first link of the set of links to produce a scaled link weight; and adding the scaled link weight to a second link weight included in a second link of the set of links to produce the weighting score.

18. The system of claim 10, wherein the cache engine is configured to prefetch by:

requesting the second data item from the off-premise computing system and storing the second data item in storage local to the on-premise computing system.

19. A non-transitory computer-readable medium storing instructions that, when executed by a processor, cause the processor to perform a method for prefetching data in a hybrid cloud system having an on-premise computing system and an off-premise computing system, the method comprising:

receiving, at the on-premise computing system, a request to access a first data item;

identifying, within a graph structure, a sequence of accesses made prior to requesting the access to the first data item;

identifying, within the graph structure, a node that is a threshold number of hops forward from the requested item;

calculating a weighting score for the identified node, based on a set of links that terminate on the identified node;

determining that the weighting score is above a weighting score threshold; and responsive to determining that the weighting score is above the weighting score threshold, prefetching, from the off-premise computing system, a second data item associated with the identified node.

20. The non-transitory computer-readable medium of claim 19, wherein each link of the set of links includes an associated link weight.

* * * * *